Patented June 14, 1927.

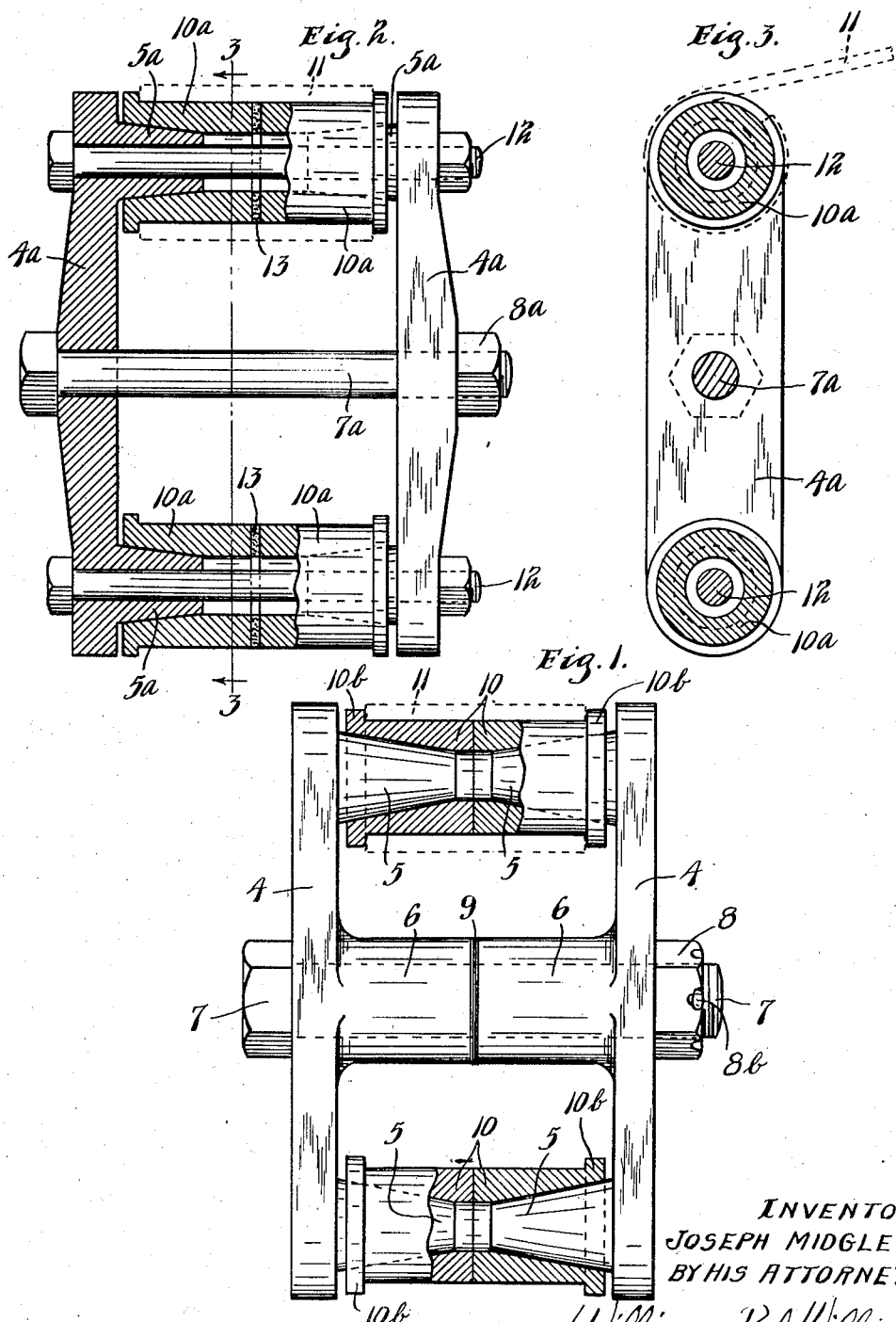

1,632,663

UNITED STATES PATENT OFFICE.

JOSEPH MIDGLEY, OF BRAINERD, MINNESOTA, ASSIGNOR OF ONE-THIRD TO JOHN L. CHESEBROUGH, OF DULUTH, MINNESOTA, AND ONE-THIRD TO T. L. ROSSER CHESEBROUGH, OF CHICAGO, ILLINOIS.

SHACKLE BOLT.

Application filed January 23, 1926. Serial No. 83,234.

This invention relates to shackles especially adapted to hingedly connect the springs with the frame on a motor vehicle.

It is the main object of the invention to provide a simple but highly efficient shackle of this class which will overcome rattling so common in most types of shackles on the market at this time, which will automatically take up for wear on the movable parts thereof and which will provide an equal distribution of the wear on the movable parts over a large area of bearing surface.

It is a further object to provide a shackle especially adapted for motor vehicles having spaced frame or side members provided with sets of oppositely disposed tapered trunnions and bushings carried by the springs and frame of the motor vehicle or other device having tapered end portions adapted to conform to the shape of said trunnions, whereby the trunnions and bushings may always be tightly seated although nevertheless capable of turning relative to each other.

A still further object is to provide said frame members with resilient means, whereby the same will be clamped together with sufficient excess elasticity to take up play between the tapered trunnions and bushings as said parts become worn.

These and other objects of the invention with be apparent from the following description made in connection with the accompanying drawings wherein like characters refer to similar parts throughout the several views and in which:—

Fig. 1 is a front elevation of the preferred form of the device, some parts being broken away and shown in section, the end portion of a spring being shown in dotted lines;

Fig. 2 is a view partially in front elevation and partly in vertical section of a modified form of shackle; and Fig. 3 is a vertical cross section taken on the line 3—3 of Fig. 2.

In the preferred form of the device illustrated in Fig. 1, a pair of spaced frame members or bars 4 are provided having preferably flat outer sides and adapted to be alined and disposed in parallel relation. These bars 4 are constructed from steel or other metal having a comparatively high degree of resiliency. Adjacent either end of each of said frame members 4, is a tapered trunnion 5 preferably formed integrally with its frame member. These trunnions 5 are of truncated conical shape, the pitch of the sides thereof being preferably from 55 to 80 degrees. A pair of oppositely projecting sleeves 6 are provided centrally located on the inner sides of the bars 4. These sleeves are of relatively wide diameter, having smooth outer surfaces. A headed bolt 7 is passed through the sleeves 6 of the two frame members 4, having its threaded end engaged by means of a nut 8 engaging the outer surface of one of frame members 4. Nut 8 is provided with a wedge $8^b$ or some other means for locking the same to bolt 7. Between the two ends of sleeves 6, a plurality of shims 9 or other annular elements, are interposed, spacing said sleeves slightly apart when said members are clamped together by the bolt 7.

Bushings 10, adapted to be driven in, keyed to, or otherwise secured to springs 11, and the frame of the motor vehicle or other device shown in dotted lines, are super-imposed on trunnions 5. These bushings 10 have their outer end portions recessed to form tapered bearing surfaces conforming to the shape of trunnions 5. For convenience in attaching said bushings to the springs, the bushings are made in two parts. Thickened portions or flanges $10^b$ are provided at the outer ends of bushings 10.

Operation.

The attachment of this form of the device to the vehicle springs and frame is exceedingly simple. The bushings 10 are first rigidly secured to the sockets or loops formed in the spring and frame of the motor vehicle or other device, as illustrated, one of said bushings being driven in from either side thereof. The frame members 4 or sides of the shackle are then attached with the trunnions 5 seated in bushings 10. The tapered recesses of bushings 10 serve to aline the various oppositely disposed parts of the shackle. The frame members 4 of the shackle are made of resilient steel and it will be noticed that these members are sufficiently thin in portions thereof to permit the same to be slightly flexed when the two frame members are clamped together. One or more shims or other annular members are interposed between the ends of sleeves 6 and the bolt 7 is then inserted from said sleeves.

The frame members 4 may be then clamped together by tightening the lock nut 8. The device is so constructed that when the trunnions 5 are tightly seated within bushings 10, the ends of sleeves 6 will be spaced slightly apart. A single shim or pair of shims placed between the ends of sleeves 6 will permit the frame members to be clamped together, flexing slightly the central portions thereof. As the trunnions and bushings become worn, the resilient action of frame members 4 will cause trunnions 5 to be snugly seated in bushings 10, automatically taking up for wear. When the working parts are worn to such an extent that members 4 are no longer flexed, the bolt 7 may be removed and one of the shims taken out, whereupon the ends of sleeves 6 will be again spaced apart and the members may be clamped tightly together by bolt 7 to give the excess tension needed to automatically take up for wear. It has been found through experimentation that it will not be necessary to remove one of these shims for over a year, assuming the motor vehicle to have been given normal use.

It is a well known fact that the hardest wear on a shackle occurs adjacent the frame members on the bolt or trunnions. Applicant has provided tapered trunnions with their larger ends disposed at the points receiving the greatest wear. The wear will thus be equally distributed over the large area of wearing surface afforded by trunnions and bushings.

It will be seen that the shims act merely as spacers to limit the flexing of the frame members 4 and to permit the proper spaced relation between the ends of sleeves 6 to be maintained.

Applicant has thoroughly tested his device and has found that when a two ton side pressure is exerted on the frame members 4, nevertheless the bushings 10 will turn readily as required on trunnions 5.

The modified form of the invention illustrated in Figs. 2 and 3 is essentially similar to the form above described. Spaced frame members 4ª are provided, carrying on their inner sides adjacent their outer ends, the tapered trunnions 5ª. Trunnions 5ª, however, are recessed to permit the nutted bolts 12 to be inserted therethrough, adapted to clamp their ends and said frame members 4ª together. Bushings 10ª are provided, adapted to be rigidly secured to the springs 11 and frame respectively of a motor vehicle and having the tapered recesses adjacent their outer ends conforming to the shape of said trunnions 5ª. Washers or packings 13 are interposed between the ends of bushings 10ª. A relatively large bolt 7ª is inserted through the central portions of frame members 4ª having the lock nut 8ª engaging the threaded end thereof.

Frame members 4ª are constructed of steel or other metal with a considerable degree of resiliency and are sufficiently thin to permit of a slight compression when clamped together tightly by means of bolt 8ª. This resiliency, resisting the clamping action of said bolt, is sufficient to cause any play between trunnions 5ª and bushings 10ª to be automatically taken up as the mutually engaged surfaces become worn.

When this form of the device is put on, the bushings 10ª are, of course, first rigidly secured to the springs and frame members of the vehicle, after which the side or frame members of the shackle 4ª are nested in the opposite ends thereof. Bolts 12 are next passed through the recesses in trunnions 5ª and are tightened sufficiently to take up the play between said parts. The main bolt 7ª is then inserted through the alined recesses in frame members 4ª and securely tightened to put the right amount of tension on frame members 4ª.

From the above description it will be seen that applicant has invented a simple but highly efficient anti-rattling shackle for vehicles capable of automatically taking up for wear and constructed to withstand hard usage. The wearing quality of the devices is of the best since the distribution of wear is equalized over a large area of bearing surface and since the ends of the bushings subjected to the greatest wear are contacted by tapered trunnions fitting therewithin.

It will, of course, be understood that various changes may be made in the details, form, proportions and arrangement of parts without departing from the scope of this invention.

While the shackle is especially adapted for motor vehicles it is of course obvious that the invention disclosed herein is equally applicable to shackles for other devices and machines.

What is claimed is:

1. A shackle of the character described having in combination a pair of spaced frame members, oppositely alined tapered trunnions on the inner sides of said frame members, means interposed between said trunnions adapted to space said frame members apart and provided with tapered seats surrounding said trunnions, said frame members being resilient, and means for forcing the medial portions of said frame members together to flex the same and automatically compensate for wear on said trunnions and seats.

2. A shackle of the character described having in combination a pair of spaced frame members, oppositely alined tapered trunnions adjacent the ends of said frame members, means interposed between said trunnions adapted to space said frame members apart and provided with tapered seats surrounding said trunnions, and transversely disposed adjustable clamping means engaging the medial portions of said frame members adapted to flex the same to automatically compensate for wear on said bearing surfaces.

3. The structure set forth in claim 2, and means for limiting the flexing of said frame members.

4. A shackle of the character described having in combination a pair of spaced resilient frame members, oppositely alined trunnions adjacent the ends of said frame members, bushings interposed between said trunnions adapted to space said frame members apart, and adjustable means engaging the outer sides of the medial portions of said frame members adapted to flex said frame members to compensate for wear on said trunnions and bushings.

5. A shackle of the character described having in combination a pair of spaced resilient frame members, sets of oppositely alined tapered trunnions carried on the inner sides of said frame members adjacent the ends thereof, bushings having tapered bearing seats adapted to surround said sets of trunnions to space the same apart, oppositely and centrally disposed sleeves on the inner sides of said frame members, removable spacing means interposed between the ends of said sleeves and a bolt passed through said sleeves, adapted to adjustably clamp said frame members together and flex the same whereby sufficient excess tension will be put on said frame members to take up the play between said trunnions and bushings as said last mentioned parts become worn.

6. The structure set forth in claim 4, and oppositely alined lugs carried by the medial portions of said frame members adapted to contact each other to limit the flexing of said frame members.

7. A shackle of the character described having in combination a pair of spaced substantially resilient frame members, oppositely alined tapered trunnions adjacent the ends of said frame members, a bushing disposed between each set of said trunnions adapted to space said frame members apart and provided with tapered seats surrounding said trunnions, oppositely alined sleeves or hollow lugs medially carried by said frame members, a bolt passing through said lugs transversely of said frame members adapted to draw said frame members slightly together to flex the same, the inner ends of said sleeves or lugs limiting the flexing of said frame members.

8. The structure set forth in claim 7, and a removable spacer member adapted to be inserted between the ends of said lugs or sleeves.

In testimony whereof I affix my signature.

JOSEPH MIDGLEY.